United States Patent Office 3,159,628
Patented Dec. 1, 1964

3,159,628
PTERIDINE-5-OXIDE DERIVATIVES
Irwin J. Pachter, Erdenheim, and Joseph Weinstock, Phoenixville, Pa., assignors to Smith Kline & French Laboratories, Philadelphia, Pa., a corporation of Pennsylvania
No Drawing. Filed May 28, 1962, Ser. No. 197,909
13 Claims. (Cl. 260—251.5)

This invention deals with new pteridine-5-oxide derivatives and to novel processes for producing them.

The compounds of this invention have activity against various microorganisms such as, for example, antifolic acid activity. Certain members of this series also have diuretic or anti-hypertensive activity. The members of this series, as will be obvious to one skilled in the art, also have utility as intermediates, for example by reduction to diuretically active tetrahydropteridine compounds.

The 5-oxide derivatives in the pteridine series have not to date been described in the prior art. Standard synthetic methods of producing N-oxide derivatives such as by oxidation for instance using peracetic acid lead to extensive degradation of the pteridine nucelus. The processes of this invention are therefore novel and highly useful in preparing 5-oxide derivatives of pteridines in good yield.

The compounds of this invention can be illustrated by the following structural formula:

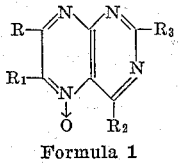

Formula 1 in which:

R is lower alkyl, aryl for example phenyl or thienyl, hydroxyl or amino;
$R_1$ is hydrogen, lower alkyl or aryl;
$R_2$ and $R_3$ are hydrogen, amino, hydroxy, lower alkylthio, lower alkoxy, lower alkyl, aryl, lower alkylamino, dilower alkylamino, N-morpholinyl, N-pyrrolidinyl, N-piperidinyl, N,N'-lower alkylpiperazinyl.

Any functional derivatives or acid addition salts of these structures are also considered equivalent to the bases represented by Formula 1. Such are formed by conventional methods well-known to the art. Reference is made to Example 10 in which the important N-acetyl derivatives are prepared.

The processes of this invention are illustrated by the following reaction.

(1)

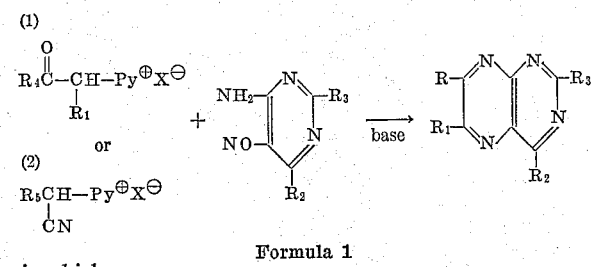

Formula 1 in which:

$R_1$, $R_2$ and $R_3$ are as described above for Formula 1;
$R_4$ is lower alkyl, aryl, lower alkoxy or amino;
$R_5$ is aryl or alkyl;
Py represents any basic tertiary organic base capable of forming quaternary salts, preferably pyridinium or derivatives of pyridinium such as picolinium, lutidinium, methylethylpyridinium and the like; and
X is any anion capable of forming a pyridinium salt such as the preferred chloride, bromide, iodide, benzenesulfonate or toluenesulfonate groups.

The process of this invention is carried out by reacting the pyridinium reagent (1 or 2) with a 5-nitroso-6-aminopyrimidine in the presence of a basic condensing agent. Ordinary solvents, alone or in mixture, are used in the reaction usually those in which the reactants are substantially soluble but to which they are inert, for example the lower alcohols such as methanol, ethanol or isopropanol, the ketones such as acetone or methyl ethyl ketone, dimethyl sulfoxide, the tertiary amides such as dimethylformamide or acetamide; or aqueous mixtures thereof. Dimethyl sulfoxide has been found to be an excellent solvent for difficulty soluble pyrimidine starting materials and because of its reactivity is usually used at from room temperature to steam bath temperature. Ordinarily the solvent will be an aqueous miscible solvent in which the organic and inorganic reactants have substantial solubility. The course of the reaction is usually brief, from a few minutes up to 3–5 hours at temperatures from about room temperature up to the boiling point of the reaction mixture. Other details will be apparent from the specific examples.

When R in the end products of this invention represents amino the cyanopyridinium intermediate (2) is used as starting material. In preparation of these compounds as noted hereafter the basic condensing agent may be an alkali metal cyanide.

The basic condensing agent can be any conventional acid binding agent except one which contains available cyanide ions which have been found to alter the course of the reaction. When the starting material, however, is an alkyl cyanide, sodium or potassium cyanide may be safely used. Exemplary of such basic agents are the alkali metal lower alkoxides, hydroxides, carbonates, or preferably lower carboxylates. Sodium or potassium acetates are advantageously used. The only additional limiting criterion for the basic reagent is that it must not react readily to displace the pyridinium moiety. Strong bases such as hydroxides therefore should be used under very mild reaction conditions.

The nitrosoaminopyrimidine starting materials are well-known in the prior art for example in U.S. Pat. Nos. 2,963,481, 2,975,180, 2,963,479 or 2,963,478 or in our copending applications. Generally these compounds are prepared by nitrosating properly substituted 6-aminopyrimidines as known in the art referred to.

The pyridinium starting materials are also well-known to the art or are described in our copending applications. These compounds are readily prepared by reacting the α-halo or sulfonate starting materials with an excess of pyridine. The cyano intermediates may also be prepared easily by reacting an aldehyde, sodium cyanide and phenylsulfonyl chloride to form the cyanosulfonate starting material directly.

Where the term "lower" is used herein in connection with alkyl, alcohol, carboxylate, alkoxy, etc. a maximum of 6 carbon atoms in the organic moiety is included. Methyl and ethyl derivatives are preferred. Aryl is used to define phenyl, thienyl and equivalent moieties with any of the standard inert substituents known to the art such as lower alkyl, halo such as fluoro, chloro or bromo, lower alkoxy etc. Other groups may obviously be substituted for instance cycloalkyl or neutral heterocyclic groups at $R_1$. These standard substituents are considered part of this invention. Variations in the reaction condition of the process of this invention other then those discussed above have not been found to yield substantial additional advantage over the process as described above. The following examples are intended to teach the full practice of this invention.

Example 1

A mixture of 7.4 g. (0.027 mole) of α-cyanobenzyl benzenesulfonate, 8 ml. of pyridine and 15 ml. of acetone is boiled for 5 minutes then added to a solution of 4.3 g. (0.02 mole) of 4,6-diamino-5-nitroso-2-phenylpyrimidine in 250 ml. of acetone followed by a solution of 2 g. (0.04 mole) of sodium cyanide in 20 ml. of water. After heating the mixture at 40° C. for 5 minutes and then at room temperature for one hour, the separated solid is separated, washed with alcohol and recrystallized from dimethylformamide to give yellow needles of 4,7-diamino-2,6-diphenylpteridine-5-oxide, M.P. 355° C.

Example 2

A mixture of 21.5 g. (0.1 mole) of 4,6-diamino-5-nitroso-2-phenylpyrimidine, 20 g. (0.2 mole) of potassium acetate, 25.6 g. (0.15 mole) of acetonylpyridinium chloride, 100 ml. of water and 1 l. of ethanol is boiled for one hour. Cooling, filtration and recrystallization from dimethylformamide gives golden crystals of 4-amino-7-methyl-2-phenylpteridine-5-oxide, M.P. 287° C. (dec.).

Example 3

A mixture of 8 g. of α-cyanobenzyl benzenesulfonate (prepared from benzaldehyde, sodium cyanide and benzenesulfonyl chloride), 8 ml. of pyridine and 15 ml. of acetone is boiled for 5 minutes then added to a suspension of powdered 4,6-diamino-2-methylthio-5-nitrosopyrimidine in 300 ml. of acetone followed by 2 g. of sodium cyanide in 20 ml. of water. The deep red mixture is heated to 50° C. for 5 minutes and allowed to stand at room temperature for one hour. The separated product is recrystallized from dimethylformamide to give pale yellow needles of 4,7-diamino-2-methylthio-6-phenylpteridine-5-oxide, M.P. 351° C. (dec.).

Example 4

A mixture of 1.39 g. of 4,6-diamino-5-nitrosopyrimidine, 1.96 g. of potassium acetate, 2.56 g. of acetonylpyridinium chloride in 20 ml. of water and 250 ml. of ethanol is boiled for 1½ hours. The resulting solid was recrystallized from ethanol with charcoal to give yellow prisms of 4-amino-7-methylpteridine-5-oxide, M.P. 250–251° C. (dec.).

This compound is particularly useful as an intermediate using catalytic hydrogenation with Raney nickel catalyst to form the 5,6,7,8-tetrahydropteridine derivative which is an active diuretic.

Example 5

A mixture of 2.15 g. of 4,6-diamino-5-nitroso-2-phenylpyrimidine, 1.96 g. of potassium acetate, 3.98 g. of phenacylpyridinium bromide (prepared from phenacyl bromide in excess pyridine) in 20 ml. of water and 300 ml. of methanol is boiled for one hour then cooled to separate yellow needles of 4-amino-2,7-diphenylpteridine-5-oxide, M.P. 258–260° C.

Example 6

A mixture of 2 g. of propiophenone-α-pyridinium bromide (prepared by reaction of the halide with an excess of pyridine in ether), 1.1 g. of 2,6-diamino-5-nitroso-4-methylpyrimidine, 0.9 g. of sodium acetate in aqueous acetone is heated for 2 hours to give 2-amino-4,6-dimethyl-7-phenylpteridine-5-oxide.

Example 7

A mixture of 4 g. of α-cyanobenzyl benzenesulfonate, 4 ml. of lutidine and 10 ml. of acetone is heated briefly then added to a mixture of 2-(α-thienyl)-4,6-diamino-5-nitrosopyrimidine with 1 g. of sodium carbonate. After heating briefly 2-(α-thienyl)-4,7-diamino-6-phenylpteridine-5-oxide is recovered.

Example 8

Substituting 2-methyl-4-hydroxy-5-nitroso-6-amino pyrimidine for the pyrimidine of Example 3 in molar equivalent quantities gives 2-methyl-4-hydroxy-6-phenyl-7-aminopteridine-5-oxide.

Substituting 4,6-diamino-5-nitroso-2-(p-tolyl)pyrimidine in Example 2 gives 2-(p-tolyl)-4-amino-7-phenylpteridine-5-oxide.

Substituting 6-amino-4-methylamino-5-nitroso-2-phenylpyrimidine in Example 4 gives 2-phenyl-4-methylamino-7-methylpteridine-5-oxide.

Substituting 3-thiophenealdehyde (Hartough, "Thiophene and Its Derivatives," 1952, page 317) or 5-ethylthiophene-2-aldehyde (page 318) for benzaldehyde of Example 3 gives 2,7-diamino-4-methylthio-6-(3-thienyl)-pteridine-5-oxide and 2,7-diamino-4-methylthio-6-(5-ethyl-3-thienyl)-pteridine-5-oxide respectively.

Substituting 5-chloro-2-acetylthiophenepyridinium bromide (prepared by α-brominating 5-chloro-2-acetylthiophene. (Hartough, page 341) then reacting with excess pyridine) in Example 2 gives 4-amino-2-phenyl-7-(5-chloro-2-thienyl)-pteridine-5-oxide.

Substituting desoxybenzoin pyridinium bromide (prepared by monobrominating desoxybenzoin and reacting the α-bromo compound with an excess of pyridine) for acetonylpyridinium chloride in Example 4 gives 4-amino-6,7-diphenylpteridine-5-oxide.

Example 9

The procedure of Example 3 is modified to accommodate for the lack of solubility of 2,6-diamino-4-methylthio-5-nitrosopyrimidine in acetone. A 3.7 g. (0.02 mole) sample of the pyrimidine in 40 ml. of dimethyl sulfoxide is diluted in rapid succession with 250 ml. of boiling acetone, with a solution of 8.0 g. of α-cyanobenzyl benzenesulfonate, 8 ml. of pyridine and 15 ml. of previously heated acetone and finally with 2 g. of sodium cyanide in 20 ml. of water. Yellow prisms of 2,7-diamino-4-methylthio-6-phenylpteridine-5-oxide separate almost immediately, M.P. 306–308° C. (dec.).

Example 10

A 10.0 g. sample of diacetylated 2,4,6-triamino-5-nitrosopyrimidine (prepared by reacting the pyrimidine with acetic anhydride) in 120 ml. of dimethylsulfoxide is reacted with 16.6 g. of α-cyanobenzyl benzenesulfonate, 16.6 ml. of pyridine and 4.1 g. of sodium cyanide as in Example 9 to separate the bright yellow diacetylaminopteridine derivative. This material (5 g.) is suspended in 100 ml. of boiling methanol and 5 g. of sodium methoxide in 75 ml. of methanol added. The mixture is boiled for 5 minutes, diluted with water, slurried with 15 ml. of acetic acid and heated with 200 ml. of water. The filtered yellow solution is diluted while hot with excess ammonia to give yellow plates of 2,4,7-triamino-6-phenylpteridine-5-oxide M.P. 340° C. (dec.).

Example 11

A mixture of 0.5 g. of 4,6-diamino-5-nitroso-2-phenylpyrimidine, 1.6 g. of the pyridinium salt of bromoacetamide, 0.5 g. of potassium acetate and 50 ml. of ethanol is heated at reflux. Concentration gives 4-amino-7-hydroxy-6-phenylpteridine-5-oxide, M.P. 251–252° C.

Example 12

A 1.0 g. sample of 2,7-diamino-4-methylthio-6-phenylpteridine-5-oxide (Example 9) is heated at reflux for 16 hours with 2 g. of sodium methoxide in 100 ml. of methanol to give yellow prisms of 2,7-diamino-4-methoxy-6-phenylpteridine-5-oxide, M.P. 255–256° C. (dec.).

Example 13

A mixture of 2.45 g. of 2,7-diamino-4-methylthio-6-phenylpteridine-5-oxide (Example 3) and 100 ml. of piperidine is heated at reflux for 16 hours. Removal of excess piperidine and recrystallization of the separated product from ethanol gives 2,7-diamino-4-N-piperidino-6-phenylpteridine-5-oxide, M.P. 250–252° C. (dec.).

Substituting pyrrolidine for piperidine gives the 4-N-pyrrolidinyl analogue. In like manner the dibutylamino, N-methyl-N-piperazino and N-morpholino analogues are prepared. If an easily volatile amine such as ammonia, dimethylamine, etc. is desired, reaction in an autoclave in ethanol overnight is used.

What is claimed is:
1. A compound of the structure:

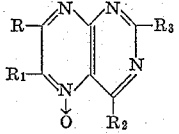

in which:

R is a member selected from the group consisting of lower alkyl, phenyl, thienyl, hydroxyl and amino;

$R_1$ is a member selected from the group consisting of hydrogen, lower alkyl, phenyl and thienyl; and $R_2$ and $R_3$ are, respectively, members selected from the group consisting of hydrogen, amino, hydroxy, lower alkylthio, lower alkoxy, lower alkyl, phenyl, thienyl, lower alkylamino, dilower alkylamino, N-morpholinyl, N-piperidinyl, N-pyrrolidinyl and N,N'-lower alkylpiperazinyl.

2. A compound of the structure:

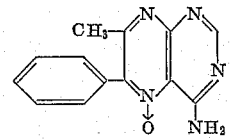

3. A compound of the structure:

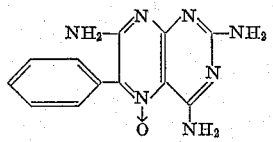

4. A compound of the structure:

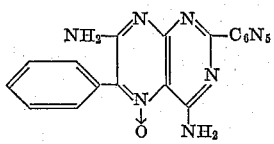

5. A compound of the structure:

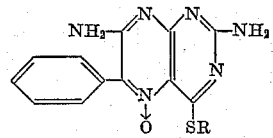

in which R is lower alkyl.

6. 2,7-diamino-4-methylthio-6-phenylpteridine-5-oxide.
7. 4,7-diamino-2-methylthio-6-phenylpteridine-5-oxide.
8. The process of preparing pteridine-5-oxides comprising reacting a compound selected from the group consisting of:

(1)  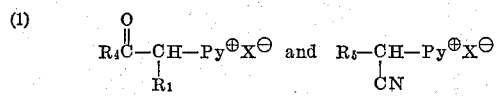

in which:

$R_4$ is a member selected from the group consisting of lower alkyl, lower alkoxy, amino, phenyl and thienyl;

$R_5$ is a member selected from the group consisting of lower alkyl, phenyl and thienyl;

$R_1$ is a member selected from the group consisting of hydrogen, lower alkyl, phenyl and thienyl;

Py is pyridinium; and

X is a member selected from the group consisting of chloro, bromo, iodo, benzenesulfonate and toluenesulfonate, with a 5-nitroso-6-aminopyrimidine in the presence of an acid binding catalyst selected from the group consisting of an alkali metal lower alkoxide, hydroxide, lower carboxylate, carbonate and, when structure (2) is used, cyanide at temperatures from about room temperature up to the boiling point of the reaction mixture.

9. The process of claim 8 characterized in that the acid binding agent is an alkali metal acetate.

10. The process of claim 8 characterized in that the reaction is run in acetone.

11. The process of claim 8 characterized in that the reaction is run in a lower alcohol solvent.

12. The process of claim 8 characterized in that the reaction is run in dimethyl sulfoxide.

13. The process of preparing pteridine-5-oxides comprising reacting a compound of the formula:

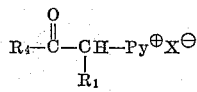

in which:

$R_4$ is a member selected from the group consisting of lower alkyl, lower alkoxy, amino, phenyl and thienyl;

$R_1$ is a member selected from the group consisting of hydrogen, lower alkyl, phenyl and thienyl;

Py is pyridinium; and

X is a member selected from the group consisting of chloro, bromo, iodo, benzenesulfonate and toluenesulfonate, with a 5-nitroso-6-aminopyrimidine in the presence of an acid binding catalyst selected from the group consisting of an alkali metal lower alkoxide, hydroxide, lower carboxylate and carbonate at temperatures from about room temperature up to the boiling point of the reaction mixture.

References Cited in the file of this patent
UNITED STATES PATENTS

| | | |
|---|---|---|
| 2,500,131 | Linsker | Mar. 7, 1950 |
| 2,518,130 | Evans et al. | Aug. 8, 1950 |
| 2,581,889 | Timmis | Jan. 8, 1952 |
| 2,940,972 | Roch | June 14, 1960 |

OTHER REFERENCES

Linsker et al.: J. Amer. Chem. Soc., vol. 68 (1946), pages 192–3.

Spickett et al.: J. Chem. Soc., London (1954), pages 2887–95.

Osdene et al.: J. Chem. Soc., London (1955), pages 2036–8.